United States Patent
Fujimoto et al.

(10) Patent No.: US 8,543,618 B2
(45) Date of Patent: Sep. 24, 2013

(54) APPARATUS, PROGRAM, AND METHOD FOR MAP DATA UPDATE

(75) Inventors: Hidetoshi Fujimoto, Anjo (JP); Toshio Nomura, Nagoya (JP); Yasutaka Atarashi, Kariya (JP); Toshio Shinjo, Kawasaki (JP); Akio Samizu, Yokohama (JP)

(73) Assignees: DENSO CORPORATION, Kariya (JP); Kousokuya, Inc., Kawasaki-shi (JP)

( * ) Notice: Subject to any disclaimer, the term of this patent is extended or adjusted under 35 U.S.C. 154(b) by 424 days.

(21) Appl. No.: 12/458,379

(22) Filed: Jul. 9, 2009

(65) Prior Publication Data

US 2010/0023554 A1    Jan. 28, 2010

(30) Foreign Application Priority Data

Jul. 25, 2008    (JP) .................................. 2008-192544

(51) Int. Cl.
*G06F 7/00*    (2006.01)
*G06F 17/00*    (2006.01)

(52) U.S. Cl.
USPC ........................... 707/803; 701/450; 701/532

(58) Field of Classification Search
None
See application file for complete search history.

(56) References Cited

U.S. PATENT DOCUMENTS

| 2004/0085227 | A1 | 5/2004 | Mikuriya et al. |
| 2005/0058155 | A1* | 3/2005 | Mikuriya et al. ............. 370/474 |
| 2006/0122771 | A1* | 6/2006 | Mikuriya et al. ............. 701/210 |

FOREIGN PATENT DOCUMENTS

| JP | A-H8-292058 | 11/1996 |
| JP | A-2002-175593 | 6/2002 |
| JP | A-2007-271432 | 10/2007 |

OTHER PUBLICATIONS

Office Action mailed Dec. 1, 2011 in corresponding CN Application No. 200910161660.7 (and English translation).
Office Action dated May 25, 2012 in corresponding CN Application No. 200910161660.7 (and English translation).
Office Action dated Aug. 30, 2012 in corresponding CN Application No. 200910161660.7 (and English translation).

* cited by examiner

*Primary Examiner* — Ann Chempakaseril
(74) *Attorney, Agent, or Firm* — Posz Law Group, PLC

(57) ABSTRACT

In map data having link information, each of the links has reference information regarding a start point node of the link, a next link in a series of links, and an upper link. Further, links are memorized in a form of link list, and the position of the link in the link list is not changed in the course of adding/deleting a link, thereby enabling a direct reference to each of the links in the link list by the position of the link. The link information organized in the above-described manner enables the ease of the update of the map data as well as the speed-up of the calculation of, for example, a navigation route.

24 Claims, 13 Drawing Sheets

FIG. 13A | LINK ADD/UPDATE | OBJ LINK NO | START NODE NO | NEXT LINK NO | OTHER INFO |

FIG. 13B | LINK DEL | OBJ LINK NO |

FIG. 13C | NODE ADD/UPDATE | OBJ LINK NO | OTHER INFO |

FIG. 13D | NODE DEL | OBJ LINK NO |

APPARATUS, PROGRAM, AND METHOD FOR MAP DATA UPDATE

CROSS REFERENCE TO RELATED APPLICATION

The present application is based on and claims the benefit of priority of Japanese Patent Application No. 2008-192544, filed on Jul. 25, 2008, the disclosure of which is incorporated herein by reference.

FIELD OF THE INVENTION

The present invention generally relates to an apparatus that updates map data having a link and defined in series for representation of a road.

BACKGROUND INFORMATION

Conventionally, as the format of the map data for the navigation apparatus, in Japan, for example, KIWI method is generally used. A road on the map is represented by the unit of links in this method, and each link has the reference information of the start point node and the end point node. Further, the map data of the above representation method has a hierarchy of multiple layers for the purpose of speeding-up of the route finding and the like, with link IDs as the identification information assigned to each of the links in the lowest layer.

More specifically, for the purposes of data compression and efficiency of image drawing of the road with the same attributes, the links having the same attributes and being arranged in succession are grouped as a link series. Therefore, the links in the link series have the successive link IDs. In this manner, the link series is represented, in the upper layer, by the link IDs of the start side link and the end side link, for the purpose of identifying each of the links in the link series.

However, the map data in the navigation apparatus must be partially updated due to the change of the actual roads and other causes, thereby posing a problem of consistency maintenance, that is, how to manage the link IDs when existing links are divided/split into two, or two links are merged, for example, with the successive numbering of link IDs kept intact. In other words, the link data update processing requires huge processing load for the maintenance of the successive numbering.

In order to solve the numbering problem, the link numbering scheme that (a) the lowest layer links are respectively assigned with the unique link IDs in a scope of 1000 to 1099, for example, and (b) the links in a single link series has the successive link IDs such as 1000 to 1099 and 1100 to 1199, is proposed in Japanese patent document JP3725022. In the above-described manner, the existing link can be divided, for example, by dividing the above link scope to two scopes of 1000 to 1049 and 1050 to 1099. That is, the link ID successiveness is kept by dividing the scope of link IDs.

However, the update scheme disclosed in the above Japanese patent document JP3725022 that the link renumbering is saved only in a case that the scope of the link IDs covers the post-splitting link IDs, as shown in FIG. 15B. That is, if the scope of the post-splitting link IDs exceeds a predefined link ID scope, the link ID re-numbering is still required, as shown in FIG. 15C. That is, the solution presented in the above patent document is not fundamental. The scope of the link IDs may be enhanced in the above technique, only with the accompanying increase of the data amount. Further, how to define an appropriate scope of the link IDs introduces another complicacy into the data management.

SUMMARY OF THE INVENTION

In view of the above and other problems, the present invention provides an apparatus, a program, and a method for map data update with the ease of the link information management when the map data is updated.

In an aspect of the present disclosure, the map data update apparatus having a link list for link management in map data based on update data that, for updating of the link list, and specifying position information of a subject link to be updated in the link list, includes: a list enhancer for enhancing the link list so that the link list includes the position information specified by the update data, the position information currently non-existent in the link list; and an information update unit for updating information on the link that is in association with the position information specified by the update data based on the update data. Further, each of the links the represents a road in the map data, and successive links respectively having same attributes are defined as a link series in the map data. Furthermore, each of the links in a specific link series has reference information to point to a subsequent link in the specific link series.

The map data having the above-described structure enables the identification of a specific link only by using the next link reference information in the preceding link, thereby achieving the reduction of use of the successive link IDs assigned to each of the links. That is, the restriction of the successiveness of the link IDs is raised. Therefore, splitting of the existing link into two links does not cause the re-numbering of the IDs (i.e., identification information) of the existing links in the course of updating the map data. In other words, the update of the map data does not change the identification information of the existing links. As a result, the calculation load of updating the map data is reduced, thereby achieving the ease of the link information management.

Further, the split and merge of the existing links does not cause the change of the identification information of the existing links in the map data in the present disclosure. Therefore, use of the identification information itself, which is required in the conventional method, is reduced. More practically, if the links are managed in a list form and the update of the map data is performed in a manner that does not change the position of the links in the list, each of the links in the map data can be identified by the position in the list. As a result, the amount of the map data is reduced, due to the reduction of conventionally used link IDs.

The update method that does not change the existing link position in the list may be realized, for example, by (a) appending a new link at the end of the list of the links, or (b) keeping a vacant information space at the time of deleting the existing link from the list (i.e., the vacant space is saved by not performing re-numbering). Further, the new link may be added to the link list at any position. That is, not only the end of the link list but also the other position in the link list may serve as the position of the new link. In other words, the vacant space in the list created by the deletion of the existing link may be used as the position of the new link, or other position in a memory may be used as the new link position.

The links in the map data are managed in a list form, and the list is updated by the update data according to the position information of the updated link in the list. In this case, the map data update apparatus enhances the link list if the position information specified in the update data (by using a list enhancer) does not exist in the list, and the link information of the specified position in the list is then updated (by using an information update unit).

The map data update apparatus described above enables the update of the map data without changing the position of the existing link in the list. As a result, each of the links in the list can be identified by the position in the list, thereby (a) enabling the reduction of the link IDs (link identification information), (b) reducing the data amount, and (c) achieving the speed-up of data processing.

Further, the map data update apparatus is also realized as a program for controlling a computer to be serving as an equivalent apparatus, or also realized as a method for updating map data having link information. The program and the method in the appended claims can achieve the same advantageous effects as the map data update apparatus.

BRIEF DESCRIPTION OF THE DRAWINGS

Objects, features, and advantages of the present disclosure will become more apparent from the following detailed description made with reference to the accompanying drawings, in which:

FIGS. 13A to 13D are block diagrams of update data in the embodiment of the present disclosure;

DETAILED DESCRIPTION

Figure 1:
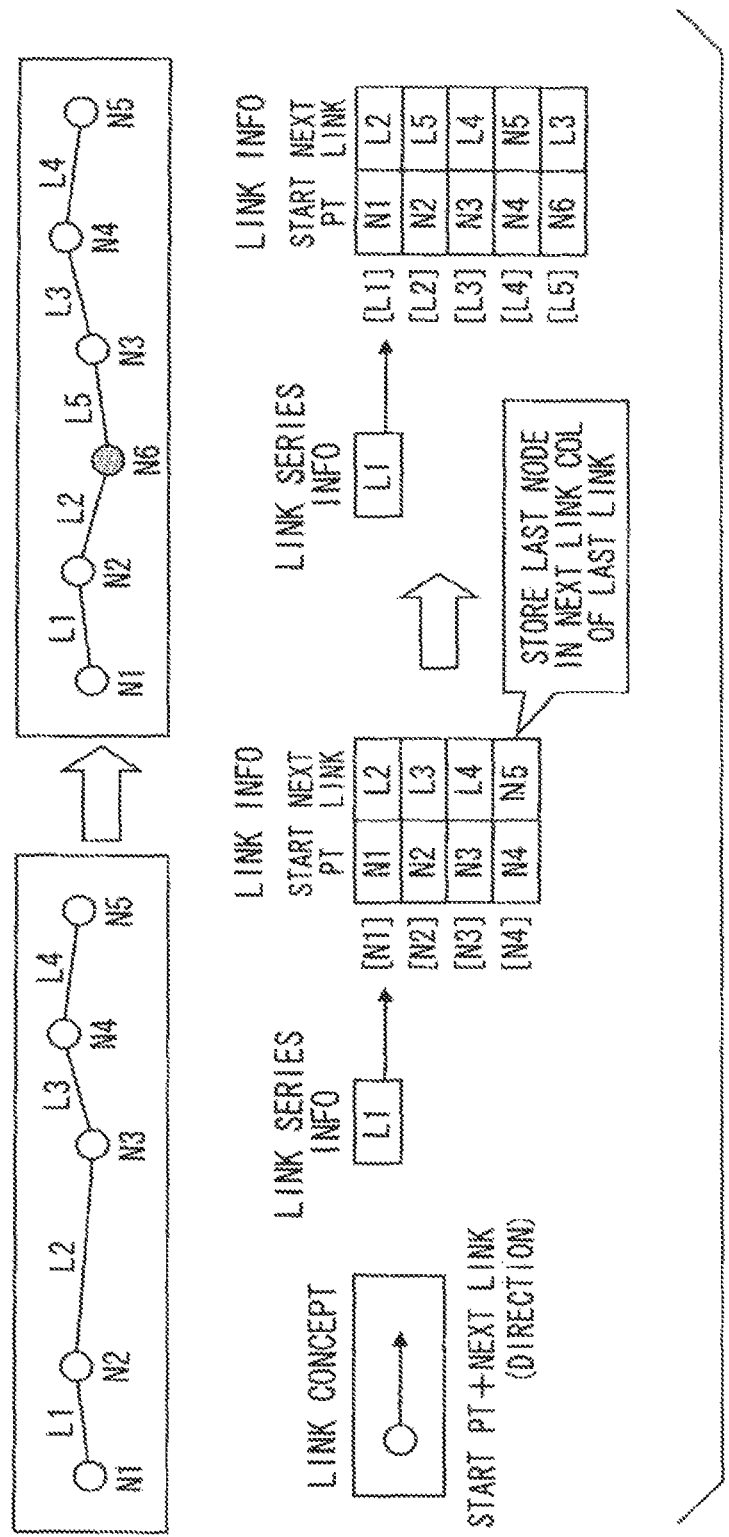
FIG. 1 is an illustration of basic link structures in an embodiment of the present disclosure.

Hereinafter, the implementation form which a present invention was applied to is described using the drawing.

1. The Overview of the Map Data

First, the overview of the map data of the implementation form is described.

FIG. 1 is an illustration of the basic structure of the map data of the present embodiment. The map data of the present embodiment features the advantageous point which expresses a link series as the connection list. Specifically, each link in the link series has the reference information of the start point (i.e., the start point node) and the reference information of the next link (i.e., the serial order of links in a link series in one way), thereby enabling the identification of two end points of the link. That is while, each link has the reference information of the start point node and the end point node in the map data of the conventional KIWI method, each link has the reference information of the next link instead of the reference information of the end point node. Therefore, based on the reference information of the next link, the identification of the end point node is enabled.

For example, in a series of links L1, L2, L3, L4, the link L1 has reference information including a start point N1 and a next link L2, the link L2 has reference information including a start point N2 and a next link L3, and the link L3 has reference information including a start point N3 and a next link L4 in the illustration of FIG. 1 on the left side. In this case, because the next link does not exist at the link L4 which is the last link of the link series, the reference information of the last node (i.e., the end point node) is stored in this example as the next link.

Further, the map data of the present embodiment keeps its consistency without changing the identification information of the existing links in case of data update. That is, in other words, as an example on the right side of FIG. 1 shows, when the existing link L2 is divided by a new node N6 to create a new link L5 that uses the new node N6 as a start node, the information on the new link L5 is appended to the link information (i.e., the link list), and the next link of the link L2 is changed to the link L5. Therefore, it is possible to update the map data without changing the identification information of the existing link in this manner.

In this case, in the data structure shown in FIG. 1, the link series information that serves as the reference to the upper layer has only the reference information of the start link that constitutes the link series, for reducing the amount of map data.

Figure 2:
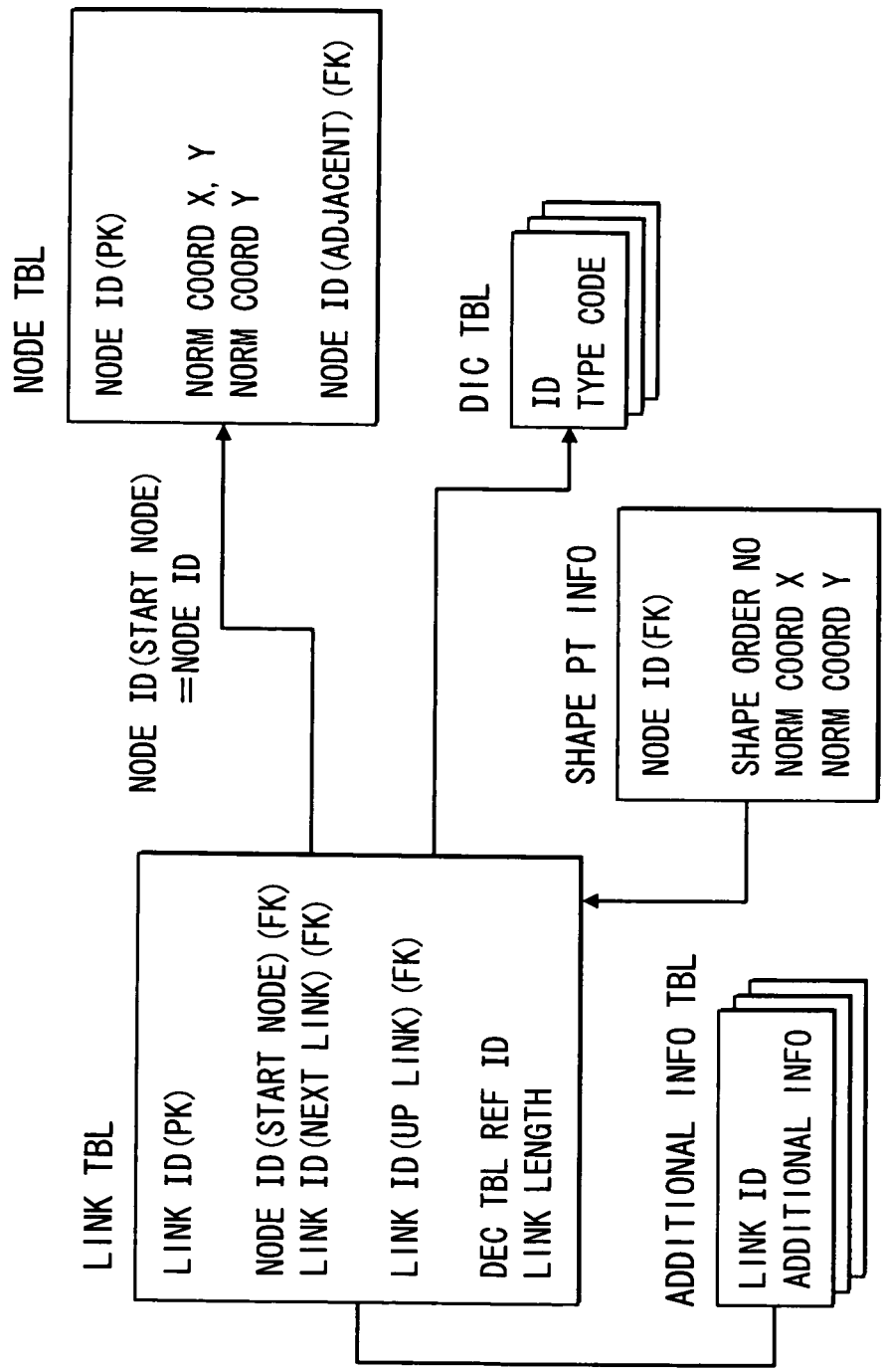
FIG. 2 is an illustration of database logic in the embodiment of the present disclosure.

FIG. 2 is an illustration of the logic-design of the database of the map data of the present embodiment. The map data of the present embodiment is equipped with a link table, a node table, an additional information table, shape point information and a dictionary table (i.e., type code and the like).

Data such as a link ID (i.e., the main key), a node_ID of the start point node (i.e., the external key), a link ID of the upper link (i.e., the external key), a dictionary table reference ID, a link length and the like is stored in the link table. In the example of FIG. 2, the correspondence of the link among the hierarchies can be specified without storing the inter-layer relationship of links separately, because each link has the reference information of the upper level link (i.e., the upper link).

Further, data such as a node_ID (i.e., the main key), normalization coordinates X and Y, the node_ID of the adjacent node (i.e., the external key) and the like is stored in the node table. Besides, data such as the link ID, additional information and the like is stored in the additional information table, and data such as the link ID (i.e., the external key), the shape order number, the normalization coordinates X and Y and the like is stored in the shape point information, and data such as the ID, the type code and the like is stored in the dictionary table respectively.

Figure 3A:
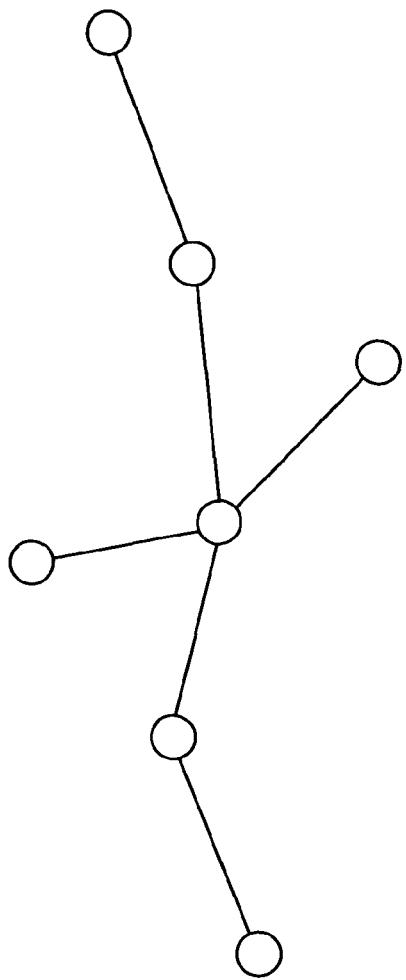
FIGS. 3A and 3B are illustrations of link structure of an intersection and link series logic in the embodiment of the present disclosure.
Figure 3B:
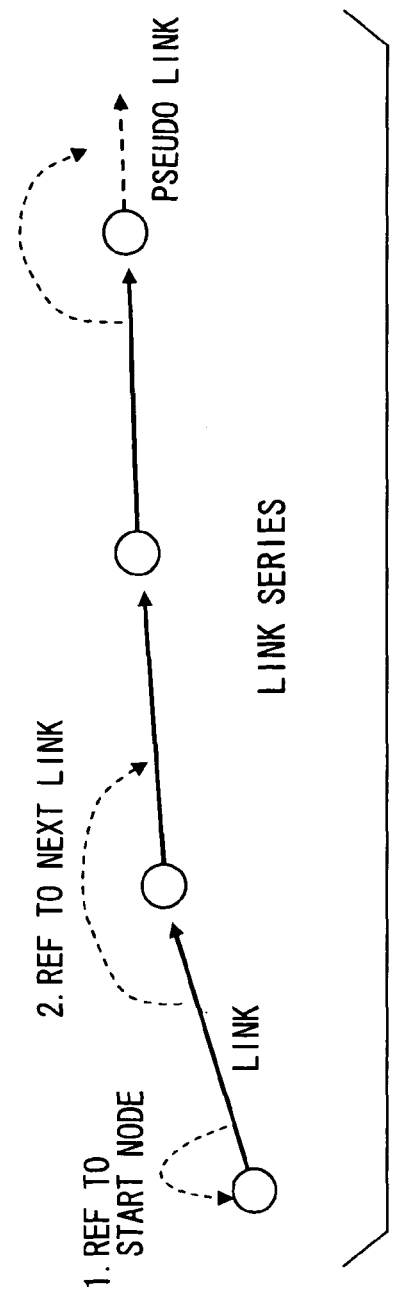

FIG. 3A is an illustration of a logic-design of the intersections (i.e., the node), and FIG. 3B is an illustration of a logic-design of the roads (i.e., the design of the link). The node is basically an intersection as described above. Though respectively different objects are conventionally used for route data and for drawing data, the same object is used for both data in the present embodiment.

On the other hand, the link is basically a road as mentioned above. Each link has the reference information of the start point node, composes a link series together with other links and is connected to the next link in the link series. Further, in the example of the present embodiment, the pseudo link which does not actually exist is set as the next link to the last link in the link series.

In the above-described manner, the link series conventionally represented as a successive ascending link IDs in the map data of the (KIWI) method is embodied as a connection list. As the merit of such a connection list-type link series, release from the successiveness requirement of the link IDs can be attained. Further, as a merit of different aspect, link connectivity and successiveness is represented by two pieces of information, that is, by using information regarding (a) the start point node and (b) the next link, thereby enabling a logic-design having no redundant information in the map data.

Figure 4:
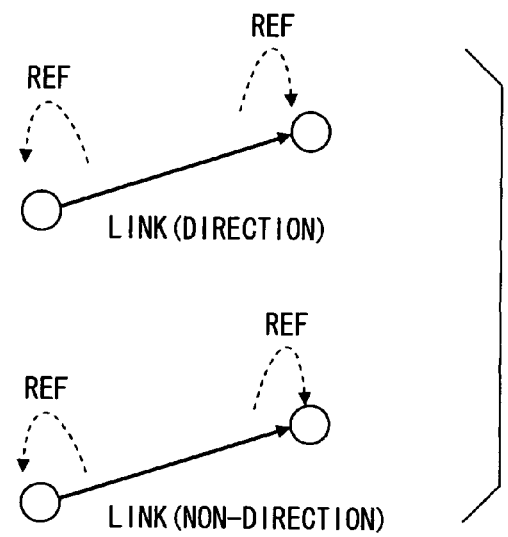
FIG. 4 is an illustration of link and node relationship in the conventional map data.

That is, as shown in FIG. 4, in the map data of the conventional update method, each link uses additional information such as a single stroke one-way routing in addition to the reference information of the nodes of two end points, for the purpose of representation of the link connectivity and succession.

Further, because of the successiveness of the link IDs of the links which compose a link series in the conventional map data, successiveness of the links and the relationship of the links between two layers are represented in the form of "link ID=the successive numbering on the starting side+the number of difference."

Figure 5:
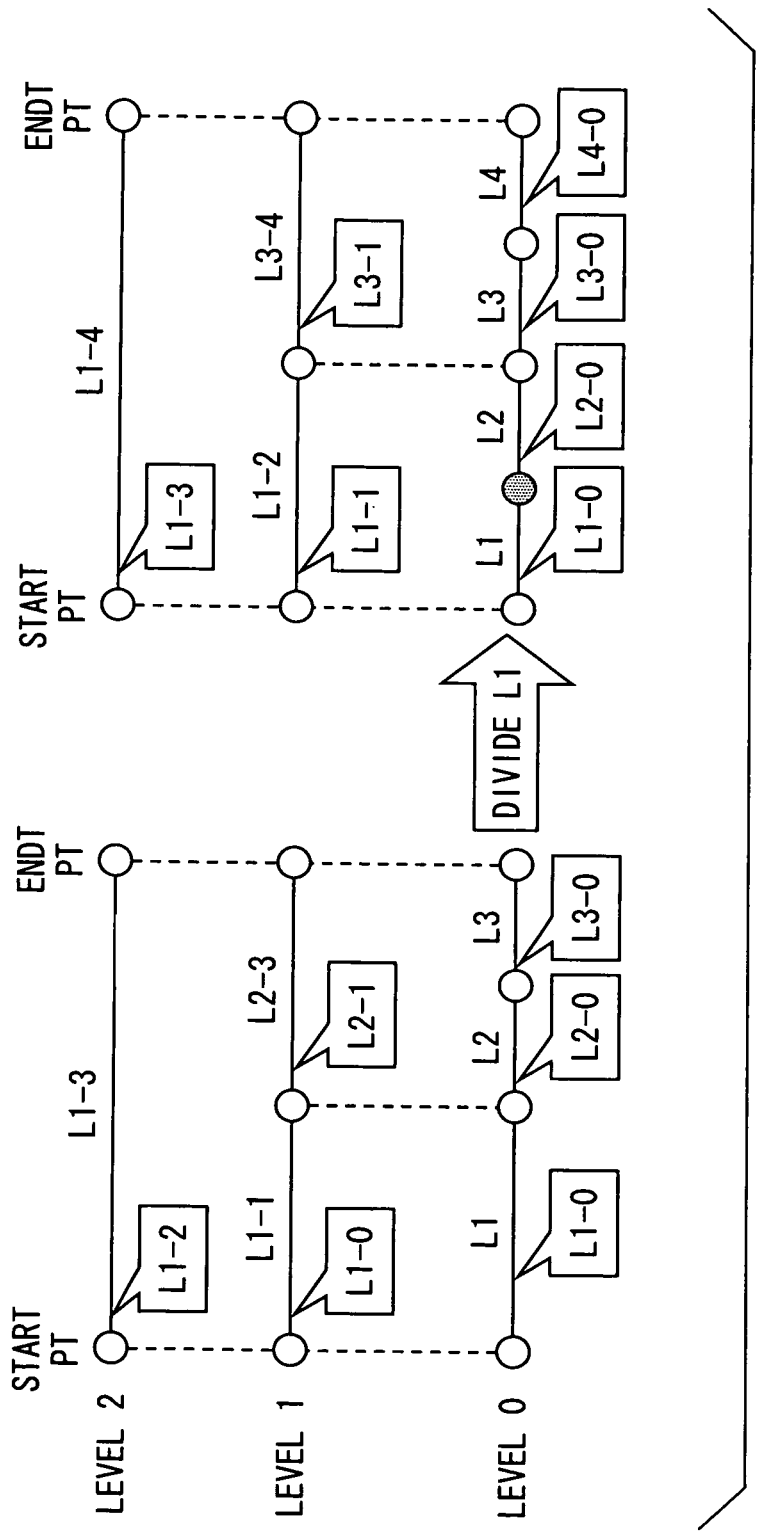
FIG. 5 is an illustration of link data structure in the conventional map data.

For example, as shown in the left side in FIG. 5, a link in the level 1 which consists of the links L2, L3 of level 0 (i.e., the lowest layer) can be represented as L2-1 by employing the start side successive link number L2 and the difference of the link IDs between the start side L2 and the end side L3. Further, a link in the level 1 which consists only of the link L1 of level 0 is represented as L1-0, because of the difference of 0. In the same manner, the link in the level 2 which consists of L1 to L3 of level 0 can be represented a L1-2. In this manner, with the representation of the link ID, the link which composes a link series can be specified.

However, in such a data structure, the "chain reaction" of link numbering is caused for the subsequent links and upper links by the change in the lower link due to the update of the map data, in order to maintain consistency. For example, when existing link L1 of level 0 is split into two as shown on the right side in FIG. 5, not only the link IDs of the subsequent links but also the link IDs of the upper level links have to be updated. That is, the sequential order of ID numbers must be maintained by the cost of re-numbering the entirety of the subsequent and upper links.

Figure 6:
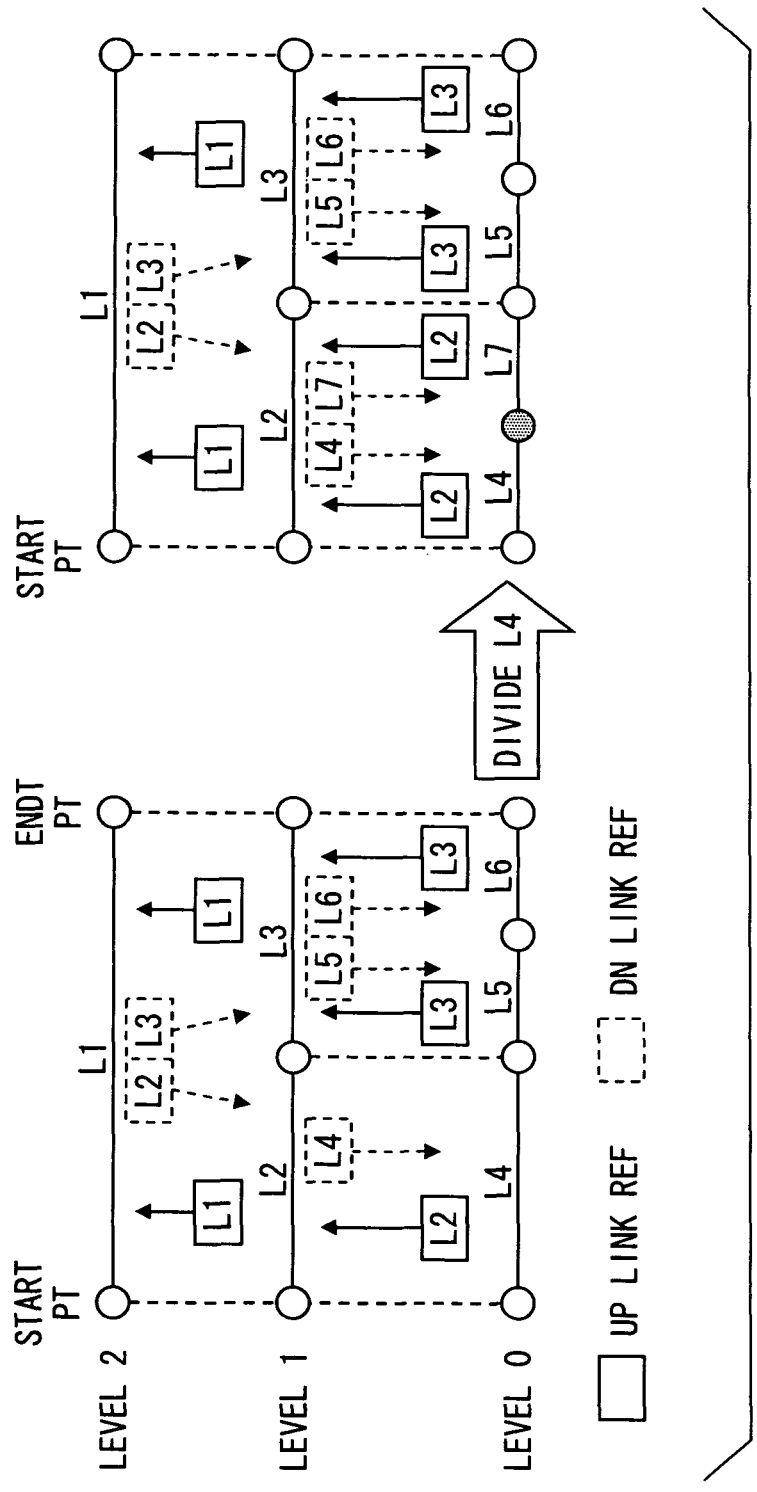
FIG. 6 is an illustration of link data structure in the embodiment of the present disclosure.

On the other hand, as shown in FIG. 6, the difference update method of the present embodiment makes it possible to localize (i.e., limit) the area of influence which needs to be changed by defining an explicitly specified reference between the links in a direct manner in the map data of the present embodiment. The left side example in FIG. 6 shows that the link L4 in level 0 has the reference information of the link L2 in level 1 as upper link reference information and the links L5, L6 in level 0 have, in the same manner, the reference information of the link L3 in level 1 respectively. Further, the links L2, L3 of level 1 have the reference information of the link L1 of level 2 respectively as the reference information of the upper level link.

Therefore, according to the data structure as described above, when the existing link L4 of level 0 is divided into two two, for example, as shown on the right side in FIG. 6, the update of the difference can be performed without changing the identification information in the subsequent links and the upper level links because there is no restriction regarding the preservation of the sequential order required in the conventional map data reference method.

Figure 7:
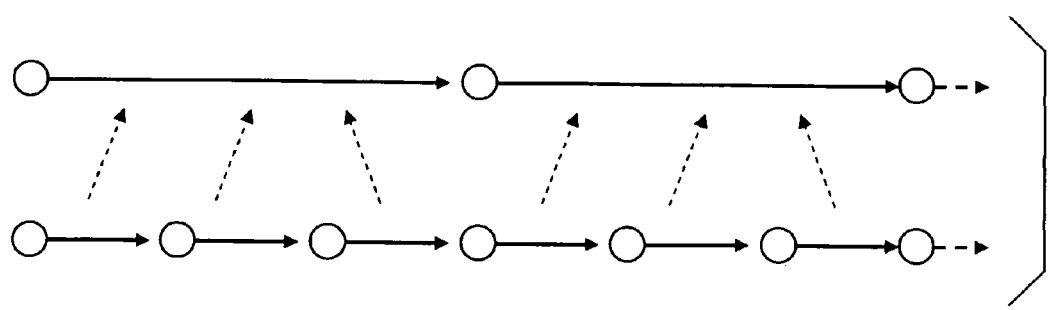
FIG. 7 is an illustration of link reference structure between an upper and a lower layers in the embodiment of the present disclosure.

In this case, the links in the lower layer has the reference information of the links in the upper layer, and the links in the upper layer has the reference information of the links in the lower layer, as shown in FIG. 6. However, the link reference may preferably and practically point to only one link in the upper layer from the link in the lower layer, as shown in FIG. 7. In this manner, it is possible to calculate a reference from an upper layer to a lower layer by summing the origin of the referencing links. That is, such calculable information is "redundant" information. Further, each link need not have information on the upper level link. That is, for example, only one starting link in a link series may have reference information of the upper link to reduce the amount of reference data in a more effective manner.

2. The Composition of the Navigation Apparatus

Next, the present embodiment of the navigation apparatus which is loaded into the vehicle as the specific use example of such map data is described.

(2-1. The Whole Composition)

Figure 8:
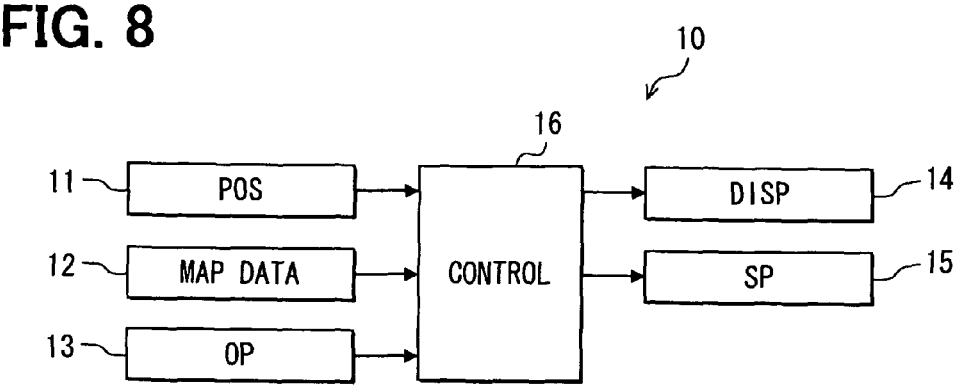
FIG. 8 is a block diagram of a navigation apparatus in the embodiment of the present disclosure.

FIG. 8 is a block diagram of the outline composition of a navigation apparatus 10. The navigation apparatus 10 is equipped with a position detector 11, a map data input unit 12, an operation device 13, a display unit 14, a speaker 15, and a control circuit 16.

The position detector 11 is a device to detect a current position of the vehicle that is equipped with the navigation apparatus 10, and includes a gyroscope, a range sensor and a GPS receiver of well-known type.

The map data input unit 12 is an equipment to input the map data which is stored in the storage media such as DVD-ROM, the hard disk drive and the like. The operation device 13 is a device for receiving various inputs from the user, and may be implemented as a touch panel disposed on a front screen of the display unit 14, or as a steering switch on the steering wheel and the like, in order to input all of the operational instructions of the navigation apparatus 10 such as map scale change, map scroll, destination setting, and the like.

The display unit 14 is a full-color display device for displaying a current vehicle position detected by the position detector 11 together with the map data from the map data input unit 12 and additional data such as a navigation route on the map and the like.

The speaker 15 composed of a speaker unit and an audio amplifier outputs the sound which is synthesized by using the control circuit 16 and the like. The speaker 15 may be saved from the configuration, if the equivalent device is installed in the vehicle.

The control circuit 16 is composed as a usual computer having, for example, a well-known type CPU, a ROM, a RAM, an I/O together with a bus like connecting these components. The CPU executes processing (e.g., the map data update process to be mentioned later) based on various information from the position detector 11, the map data input unit 12, and the operation device 13 according to the program memorized in the ROM.

(2-2. The Explanation of the Map Data)

Figure 9:
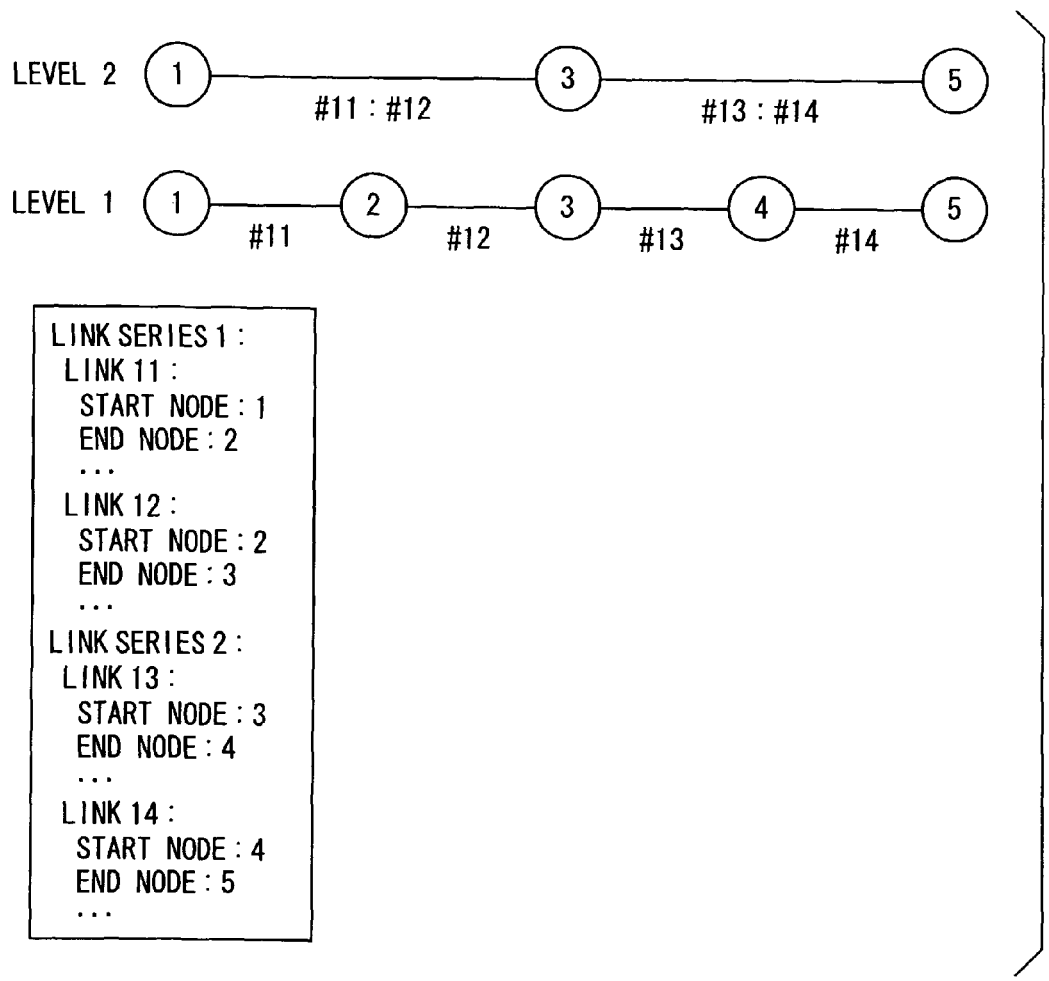
FIG. 9 is an illustration of link information in a map data using KIWI method.

The map data used in the navigation apparatus 10 is described. As shown in FIG. 9, in the map data of the conventional KIWI method, each link has the reference information of the start point node and the end point node. Further, the link series is defined as a series of multiple successive links having the same attributes, with the inter-layer link relationship based on each of the link IDs on both ends (i.e., as the start link and the end link) with the assumption of the ascending link ID series.

Figure 10:
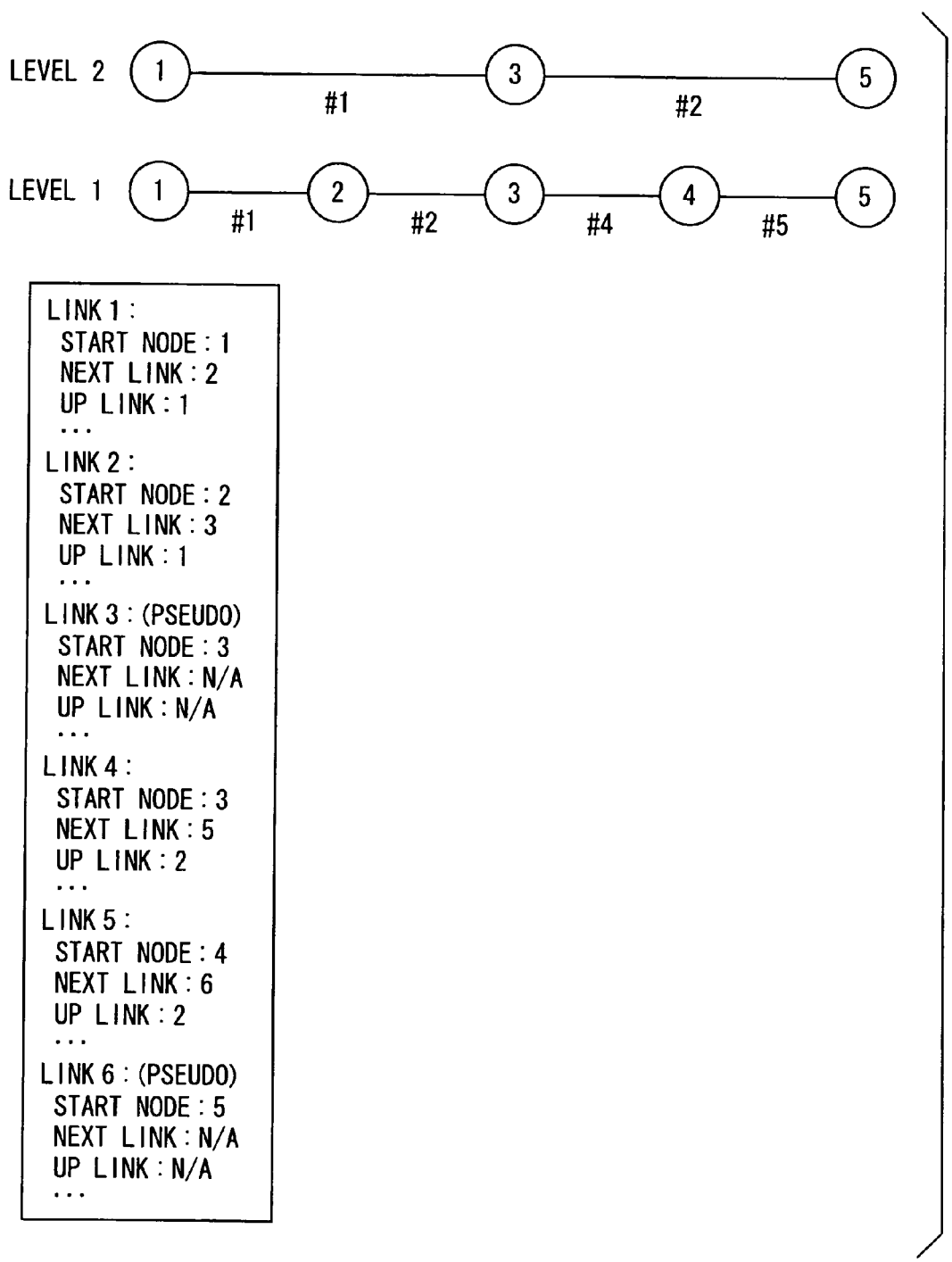
FIG. 10 is an illustration of link information in the map data used by the navigation apparatus in the embodiment of the present disclosure.

On the other hand, as for the map data which is used in the navigation apparatus 10 of the present embodiment, each link has the reference information of the start point node, the reference information of the next link in the same link series and the reference information of the upper level link as shown in FIG. 10. Further, as the next link of the last link in the link series, the pseudo link which does not actually exist is set. By the configuration described above, the next link of the last link is defined, and the last link can be handled in the same manner as the other links in terms of data management. In this case, the identification information of the links is independently managed in each of the data levels in the map data.

Further, each link is stored in a list form, thereby making it possible to identify the position of the link in the list by using the subscripts of the arrangement even after addition and deletion of a link from the link list, due to the configuration of not changing the subscripts in the update of the links. Therefore, each link does not have a link ID, and the amount of data is reduced compared to the map data used in the conventional method. Further, the node data is managed in the same manner, thereby making it also possible to identify the node position by using the subscripts of the arrangement even after the node addition/deletion.

(2-3. The Overview of Update Method of Map Data)

The overview of the update method of the map data used in the navigation apparatus 10 is described in the following.

Figure 11:
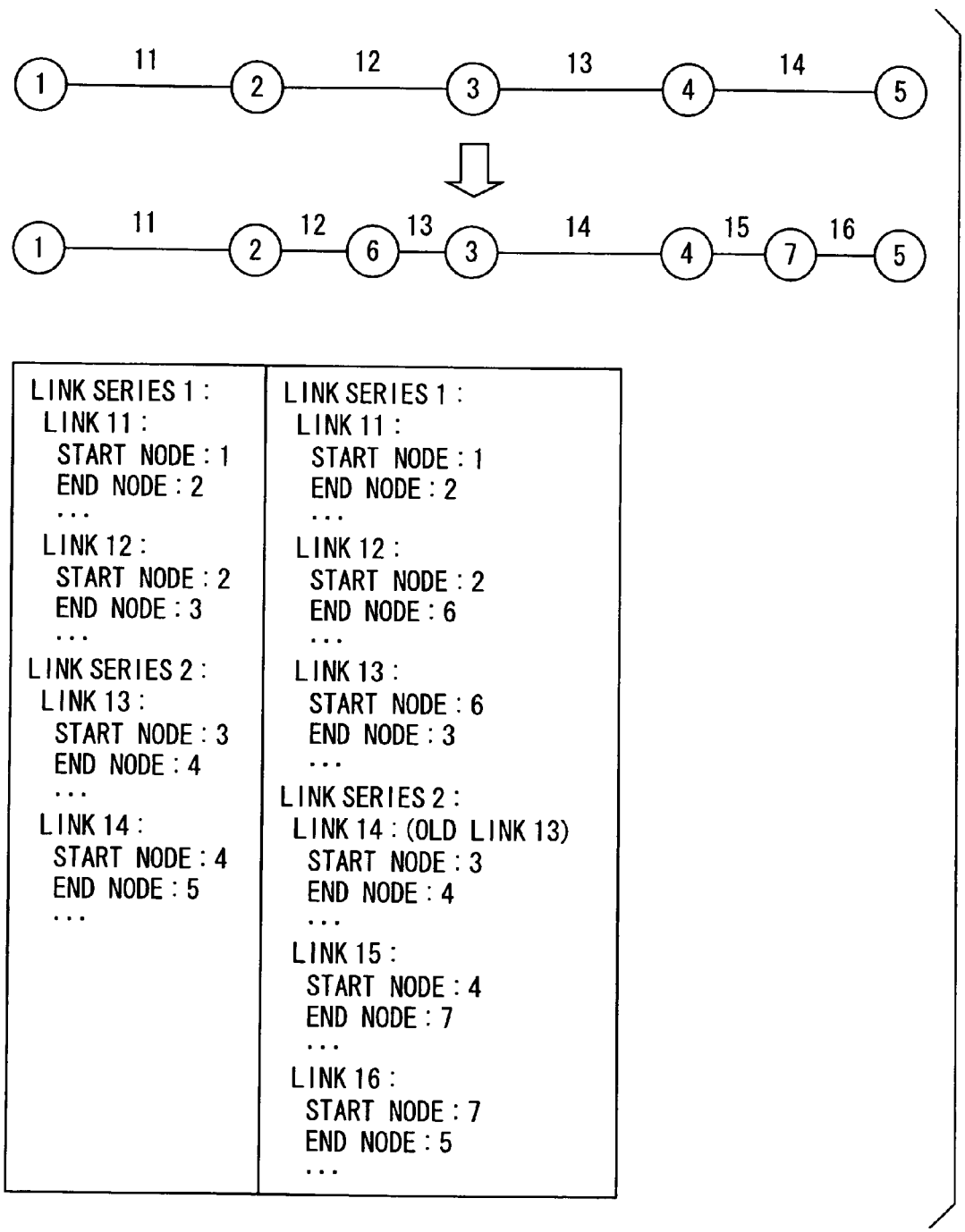
FIG. 11 is an illustration of an update method of the map data using KIWI method.

Conventionally, as shown in FIG. 9, in the map data update method (i.e., KIWI method), the update of the map data causes the "chain reaction" problem for the subsequent links when an existing link is split into two links. For example, when, from among links 11, 12, 13, 14, two existing links 12 and 14 are respectively split into two links, the link IDs of the subsequent links have to be entirely changed, as shown in FIG. 11.

Figure 12:
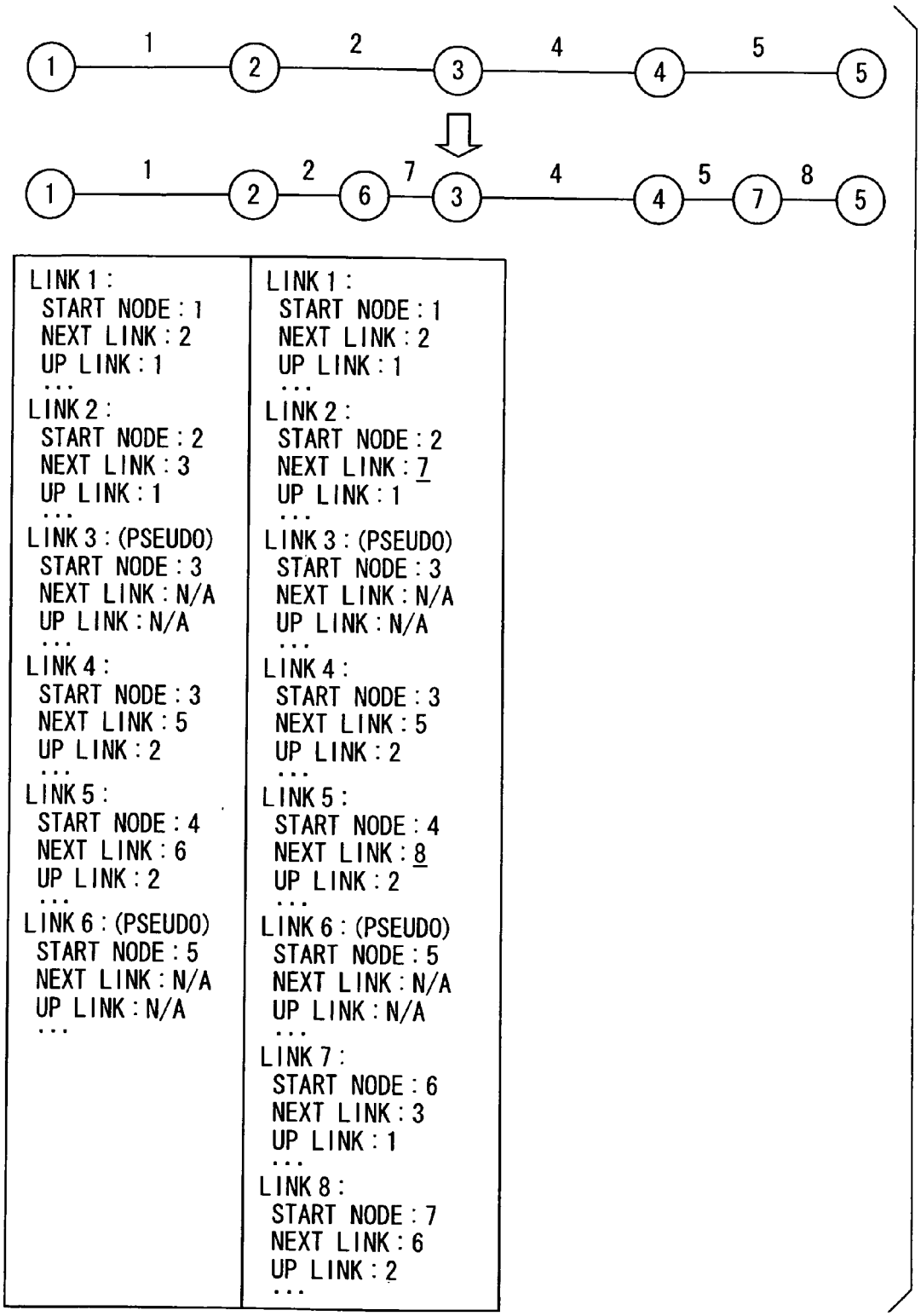
FIG. 12 is an illustration of an update method of the map data in the embodiment of the present disclosure.

On the other hand, according to the map data used in the navigation apparatus 10 of the present embodiment, the subsequent links do not have to be changed. That is, for example, as shown in FIG. 12, if the existing links 2 and 5 from among the links 1, 2, 4, 5 are respectively split into two, a link 7 having a new start point node 6 that divides the link 2 into two and a link 8 having a new start point node 7 that divides the link 5 into two are appended to the end of the link list. In this case, the start point node of the link 7 is the node 6, the next link of the link 7 is the link 3 (i.e., the pseudo link), and the upper level link of the link 7 is the link 1. Further, the start point node of the link 8 is node 7, the next link of the link 8 is the link 6 (i.e., the pseudo link), and the upper level link of the link 8 is the link 2. Furthermore, as for the existing link 2, the required change is changing the next link from the link 3 to the link 7, and, as for the existing link 5, the required change is changing the next link from the link 6 to the link 8.

(2-4. The Explanation of the Update Data)

The update data to update the map data is described in the following.

The navigation apparatus 10 performs the processing to update the map data by acquiring the update data from outside of the apparatus 10. In this case, the update data is roughly divided into four categories as shown in FIGS. 13A to 13D. In the block diagram, each of the rectangular squares represents a piece of binary value data sequence.

FIG. 13A is the update data used in the addition processing or update processing of the link list by the navigation apparatus 10, that is, the data for the processing of (a) adding a new link to the link list, or (b) updating the information on the existing links already registered to the link list. The update data includes type data (i.e., link addition/update), a link ID of a subject link that is a subject of the addition processing or the update processing (position information in the link list), that is, the link number, as well as the start point node number (reference information of the start point node), the next link number (reference information of the next link), and other information (reference information regarding the upper layer etc.).

FIG. 13B is the update data used in the delete processing of the link list by the navigation apparatus 10, that is, the data including the type data (i.e., the link deletion) and the link number that serves as the identification information of the link to be deleted.

FIG. 13C is the update data used in the addition processing or update processing of the node list by the navigation apparatus 10. The update data includes the node type (i.e., the node addition/update), a node ID of a subject node (position information in the node list) to be added/updated and other information.

FIG. 13D is the update data used in the delete processing of the node list by the navigation apparatus 10, that is, the data including the type data (i.e., the node deletion) and the node number identifying the subject node to be deleted from the node list.

In this case, the navigation apparatus 10 acquires the update data from outside by, for example, (a) establishing a direct communication with an external server in an outside of the vehicle for downloading of the data, or (b) establishing communication with a server through an information processing apparatus such as a PC or the like for indirectly acquiring the data, or (c) acquiring data medium storing the update data.

(2-5. The Map Data Update Process)

Figure 14:
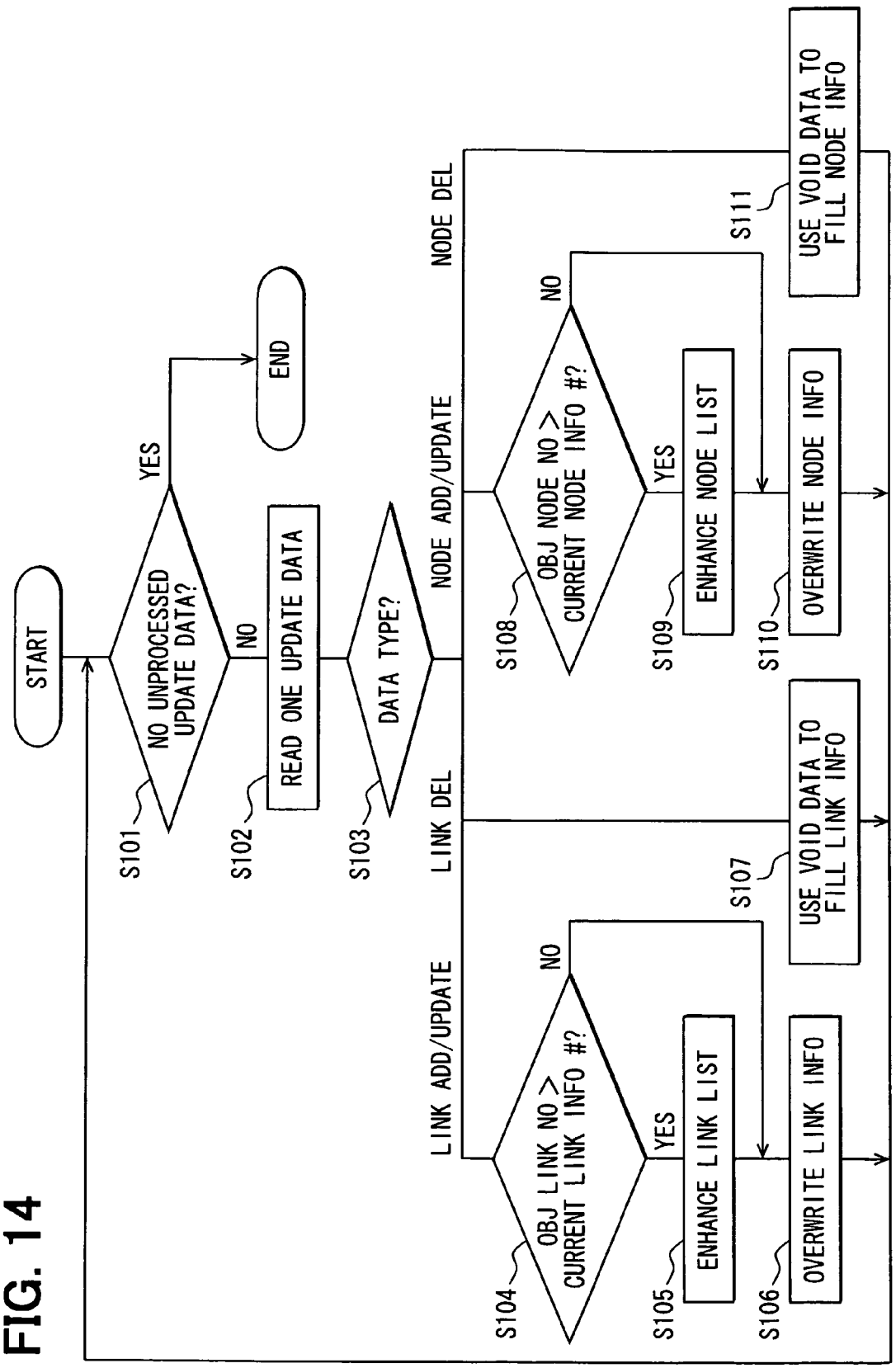
FIG. 14 is a flowchart of a map data update process in the embodiment of the present disclosure.

The map data update process performed by the control circuit 16 of the navigation apparatus 10 when the circuit 16 acquires the update data from outside of the apparatus 10 is described with reference to the flowchart in FIG. 14.

When the control circuit 16 starts the map data update process, the process determines whether or not the unprocessed update data does not exist in S101. In other words, the process determines whether or not all of the acquired data are processed by the processing after S102 that is to be mentioned later.

When determining that the unprocessed update data exists in S101, the process proceeds to S102, and it reads one entry of the update data. Next, in S103, the process determines data type of the update data read in S102.

Then, when determining that the data type of the update data is "the link addition/update" in S103, the process proceeds to S104, and the process determines whether or not the subject link number of the update data is greater than the number of link information (i.e., the number of items in the linked list). Here, the subject link number being greater than the number of the link information means that the link which does not currently exist is the subject of the processing. In other words, it means the processing is the addition of a new link to the end of the linked list.

Therefore, when determining that the subject link number is greater than the number of the link information in S104, the process proceeds to S105, and, after enhancing the linked list to include the link number of the subject link in the number of the link information, the process proceeds to S106.

On the other hand, when determining that the link number of the subject link is not greater than the number of the link information (i.e., the subject link number exists in the current link list, in other words) in S104, the process proceeds to S106 by skipping S105.

The process then returns to S101 from S106 after overwriting the link information of the subject link number in the link list by the information on the update data (i.e., the start point node number, the next link number and the other information). In this manner, the link information of the subject link number is updated if the link information includes the existing link information, or the link information of the subject link number has the new link information if the link information does not include the existing link information (e.g., in a case that the link information is about the portion that is newly enhanced in S105, or in a case that the link information stores invalid value due to the processing in S107 that is to be described later).

On the other hand, when determining that the data type of the update data in "the link deletion" in S103, the process proceeds to S107, and, after filling up the link information of the subject link number in the linked list with invalid value (i.e., void data), the process returns to S101. In other words, the process deletes the existing link of the subject link number.

Further, when determining that the data type of the update data is "the node addition/update" in S103, the process proceeds to S108, and it determines whether or not the subject node number of the update data is greater than the node information number (i.e., the number of items in the node list). Here, the subject node number being greater than the node information number means that the node which does not currently exist in the node list is the subject of the processing. In other words, it means that the processing adds a new node to the end of the node list.

Therefore, when determining that the subject node number is greater than the node information number in S108, the process proceeds to S109, and, after enhancing the node list to include the number of the subject node number in the node information number, the process proceeds to S110.

On the other hand, when determining that the subject node number is not greater than the present node information number in S108 (i.e., the subject node number exists in the current node list, in other words), the process proceeds to S110 by skipping S109.

The process returns to S101 from S110 after overwriting the node information of the subject node number in the node list by the information in the update data (i.e., the other information). In this manner, the node information of the subject node number is updated if the node information includes the existing node information, or the node information of the subject node number has the new node information if the node information does not include the existing node information (e.g., in a case that the node information is about the portion that is newly enhanced in S109, or in a case that the node information stores invalid value due to the processing in S111 that is to be described later).

On the other hand, when determining that the data type of the update data is "the node deletion" in S103, the process proceeds to S111, and, after filling up the node information of the subject node number in the node list with invalid value (void data), the process returns to S101. In other words, the process deletes the existing node of the subject node number.

After returning to S101, if determining that the unprocessed update data does not exist in S101, the map data update process concludes itself.

3. Advantageous Effects

As described in detail above, the map data used in the present embodiment has the reference information, in each link, of the next link, thereby enabling the link series to be managed without explicitly representing the link series structure. Therefore, the assignment of successively numbered link IDs in a link series is not required. That is, successiveness of the link IDs is not necessary. As a result, the update of the identification information of the each of the existing links is performed without re-numbering of the link ID, even when, for example, an existing link is split into two links. In other words, the work load of updating the map data is reduced, thereby achieving the ease of the link information management.

Figure 15A:
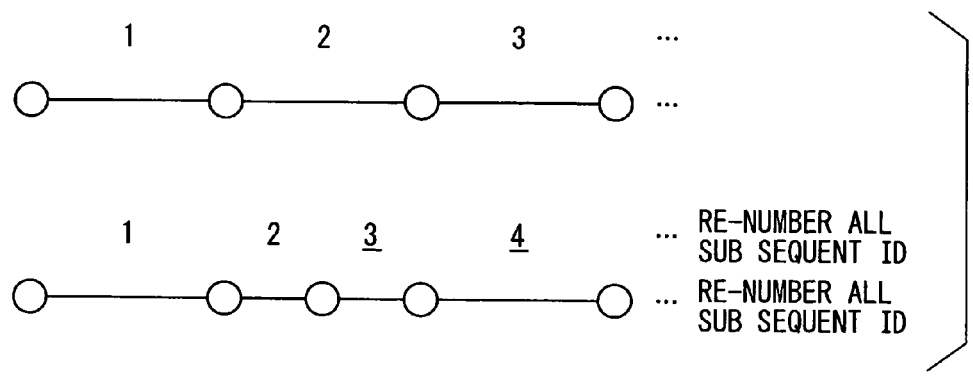
FIGS. 15A to 15C are illustrations of three conventional re-numbering methods used for updating map data.

The situation described above is observed, for example, when the existing link in the conventional KIWI method map data is split into two links as shown in FIG. 15A. That is, when an existing link is split, the subsequent link IDs have to be re-numbered for the successiveness of the link IDs.

Figure 15B:
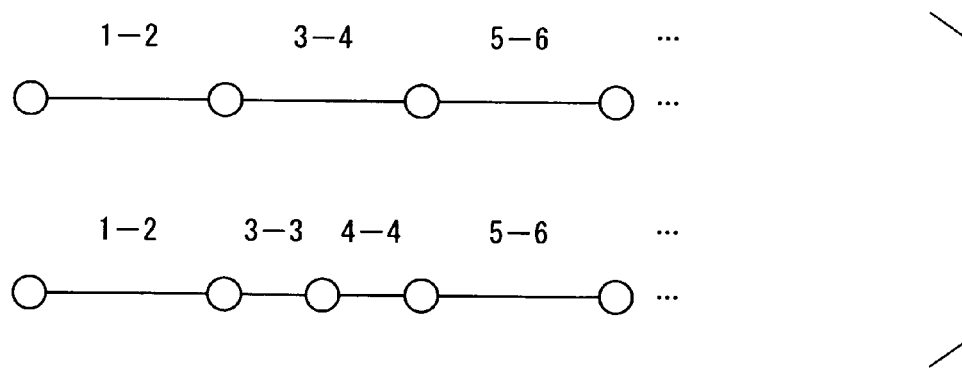
Figure 15C:
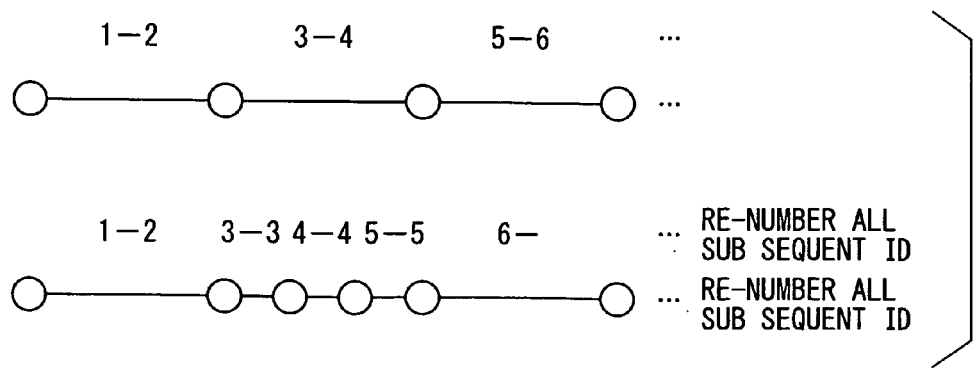

The situation is similar in the technique disclosed in Japanese patent document JP3725022 that the link renumbering is saved only in a case that the scope of the link IDs covers the post-splitting link IDs as shown in FIG. 15B. That is, if the post-splitting link IDs exceeds the predefined link ID scope, the link ID re-numbering is still required, as shown in FIG. 15C. That is, the solution presented in the above patent document is not fundamental. The scope of the link IDs may be enhanced in the above technique, only with the accompanying increase of the data amount. Further, how to define an appropriate scope of the link IDs introduces another complicacy into the data management.

On the other hand, according to the map data in the present embodiment, the restriction of successive link IDs is raised, thereby enabling an easy update of the map data without re-numbering of the subsequent link IDs, and thus enabling easy management of the link information.

Further, each link has the reference information of the start point node and the next link, and that makes it possible to specify the end point node from the start point node of the next link. That is, each link does not have to have the reference information of both of the start point node and the end point node, as is the case in the past.

Furthermore, in the map data of the present invention, the map data is managed in a list form, and the update of the map data does not change the position of the link in the list. That is, the link in the list can be pointed only by the position information in the list (i.e., subscripts). In other words, an explicit numbering such as the link ID number is not required for the data management. Therefore, the amount of the map data is reduced, and the calculation process such as a data search is speeded up, due to the direct reference to the subscripts in the list in comparison to the link ID reference searched from the link list.

4. Correspondence of Terms in the Embodiment to Claim Language

The navigation apparatus 10 in the present embodiment is equivalent to the map data update apparatus. More specifically, the control circuit 16 performing the processing of S104 and S105 is equivalent to a list enhancer, and the control circuit 16 performing the processing of S106 and S107 is equivalent to an information update unit.

5. Other Embodiments

Although the present disclosure has been fully described in connection with preferred embodiment thereof with reference to the accompanying drawings, it is to be noted that various changes and modifications will become apparent to those skilled in the art.

For example, in the above embodiment, the map data update apparatus is described as a navigation apparatus. However, the map data update apparatus of the present disclosure may be realized as the data update apparatus that generates the data for use in a navigation apparatus or similar equipment.

Such changes, modifications, and summarized schemes are to be understood as being within the scope of the present disclosure as defined by appended claims.

What is claimed is:

1. A map data update apparatus having a link list for link management in map data by using update data that updates the link list, the update data specifies position information of a subject link to be updated in the link list, the apparatus comprising:
   a memory configured to store a link list; and
   a processor, the processor configured with
      a link addition enhancer for enhancing the link list stored in the memory so that the link list includes the position information specified by the update data, when the position information is currently non-existent in the link list;
      an information update unit for updating information on the link in the memory that is in association with the position information specified by the update data based on the update data, wherein
   each of the links represents a road in the map data,
   successive links respectively having same road attributes are defined as a link series in the map data,
   each of the links in a specific link series has reference information to point to an immediate subsequent link of said each of the links in the specific link series,
   a last link in the link series has a nonexistent pseudo-link that serves as the immediate subsequent link of the last link in the link series,
   the processor is further configured to divide an existing link into two links,
   the existing link of the link series, before the existing link is divided into the two links, has reference information to point a link N as the immediate subsequent link of the existing link,
   the existing link, after being divided into the two links, remains the existing link as indicated by having a same link identifier, and the link series then further includes a new link divided from the existing link, the new link has reference information to point to the link N as the immediate subsequent link of the new link in the link series, and the existing link after being divided has reference information changed to point the new link as the immediate subsequent link of the existing link in the link series.

2. The apparatus of claim 1, wherein
   the map data has a hierarchy of multiple levels, and each of the links in lower levels has the reference information to point to a link in higher levels.

3. The apparatus of claim 1, wherein
   each of the links in the link series is managed in a list form, and
   the position of each of the links that exists in the list series is kept unchanged in the list form in the update of the link list.

4. A program product stored in a non-transitory computer-readable storage medium having instructions, when executing causing a computer to perform steps of a method, the method of updating map data having a link list for link management in map data based on update data that, for updating of the link list, specifies position information of a subject link to be updated in the link list, the method comprising:
   enhancing the link list so that the link list includes the position information specified by the update data, when the position information is currently non-existent in the link list;
   updating information on the link that is in association with the position information specified by the update data based on the update data; and
   dividing an existing link into two links, wherein
   each of the links represents a road in the map data,
   successive links respectively having same road attributes are defined as a link series in the map data,
   each of the links in a specific link series has reference information to point to an immediate subsequent link of said each of the links in the specific link series,
   a last link in the link series has a nonexistent pseudo-link that serves as the immediate subsequent link of the last link in the link series,
   the existing link of the link series, before the existing link is divided into the two links, has reference information to point a link N as the immediate subsequent link of the existing link,
   the existing link, after being divided into the two links, remains the existing link as indicated by a same link identifier, and the link series then further includes a new link divided from the existing link, the new link has reference information to point to the link N as the immediate subsequent link of the new link in the link series, and the existing link after being divided has reference information changed to point the new link as the immediate subsequent link of the existing link in the link series.

5. The program product of claim 4, wherein
   the map data has a hierarchy of multiple levels, and
   each of the links in lower levels has the reference information to point to a link in higher levels.

6. The program product of claim 4, wherein
   each of the links in the link series is managed in a list form, and
   the position of each of the links that exists in the list series is kept unchanged in the list form in the update of the link list.

7. A method of updating map data having a link list for link management in map data based on update data that, for updating of the link list, specifies position information of a subject link to be updated in the link list, the method comprising:
   enhancing the link list so that the link list includes the position information specified by the update data, when the position information is currently non-existent in the link list;
   updating information on the link that is in association with the position information specified by the update data based on the update data; and
   dividing an existing link into two links, wherein
   each of the links represents a road in the map data, successive links respectively having same road attributes are defined as a link series in the map data, each of the links in a specific link series has reference information to point to an immediate subsequent link of said each of the links in the specific link series, a last link in the link series has a nonexistent pseudo-link that serves as the immediate subsequent link of the last link in the link series, the existing link of the link series, before the existing link is divided into the two links, has reference information to point a link N as the immediate subsequent link of the existing link, the existing link, after being divided into the two links, remains the existing link as indicated by a same link identifier, and the link series then further includes a new link divided from the existing link, the new link has reference information to point to the link N as the immediate subsequent link of the new link in the link series, and the existing link after being divided has reference information changed to point the new link as the immediate subsequent link of the existing link in the link series.

8. The method of claim 7, wherein the map data has a hierarchy of multiple levels, and each of the links in lower levels has the reference information to point to a link in higher levels.

9. The method of claim 7, wherein each of the links in the link series is managed in a list form, and the position of each of the links in the link series is kept unchanged in the list form in the update of the link list.

10. The apparatus of claim 1, further comprising a link deletion processor for updating the link list by deleting the position information specified by the update data, when the update data indicates that the position information is to be deleted from the link list.

11. The apparatus of claim 1, wherein a first link of the link series, the first link having information that includes (i) position information of the first link and (ii) reference information to point to a second link, the second link is a link that is the immediate subsequent link from the first link.

12. The apparatus of claim 1, wherein when a new link is added, the new link is added to an end of the link list, the new link having information that includes (i) position information of the new link and (ii) reference information to point to the immediate subsequent link from the new link.

13. The apparatus of claim 1, wherein when the subject link in the link list is deleted, information in the link list corresponding to the subject link is filled with a void value.

14. The apparatus of claim 1, wherein the existing link and the new link of the link series each includes reference information regarding an upper link, the upper link of the existing link and the new link is the same.

15. The program product of claim 4, further comprising updating the link list by deleting the position information specified by the update data, when the update data indicates that the position information is to be deleted from the link list.

16. The program product of claim 4, wherein a first link of the link series, the first link having information that includes (i) position information of the first link and (ii) reference information to point to a second link, the second link is a link that is the immediate subsequent link from the first link.

17. The program product of claim 4, wherein when a new link is added, the new link is added to an end of the link list, the new link having information that includes (i) position information of the new link and (ii) reference information to point to the immediate subsequent link from the new link.

18. The program product of claim 4, wherein when the subject link in the link list is deleted, information in the link list corresponding to the subject link is filled with a void value.

19. The program product of claim 4, wherein the existing link and the new link of the link series each includes reference information regarding an upper link, the upper link of the existing link and the new link is the same.

20. The method of claim 7, further comprising updating the link list by deleting the position information specified by the update data, when the update data indicates that the position information is to be deleted from the link list.

21. The method of claim 7, wherein a first link of the link series, the first link having information that includes (i) position information of the first link and (ii) reference information to point to a second link, the second link is a link that is the immediate subsequent link from the first link.

22. The method of claim 7, wherein when a new link is added, the new link is added to an end of the link list, the new link having information that includes (i) position information of the new link and (ii) reference information to point to the immediate subsequent link from the new link.

23. The method of claim 7, wherein when the subject link in the link list is deleted, information in the link list corresponding to the subject link is filled with a void value.

24. The method of claim 7, wherein the existing link and the new link of the link series each includes reference information regarding an upper link, the upper link of the existing link and the new link is the same.

* * * * *